(12) United States Patent
Rönkkä et al.

(10) Patent No.: US 7,437,574 B2
(45) Date of Patent: *Oct. 14, 2008

(54) METHOD FOR PROCESSING INFORMATION IN AN ELECTRONIC DEVICE, A SYSTEM, AN ELECTRONIC DEVICE AND A PROCESSING BLOCK

(75) Inventors: Risto Rönkkä, Tampere (FI); Toni Sormunen, Kämmenniemi (FI); Antti Kiiveri, Oulu (FI); Antti Jauhiainen, Kempele (FI)

(73) Assignee: Nokia Corporation, Espoo (FI)

( * ) Notice: Subject to any disclaimer, the term of this patent is extended or adjusted under 35 U.S.C. 154(b) by 588 days.

This patent is subject to a terminal disclaimer.

(21) Appl. No.: 10/213,287

(22) Filed: Aug. 5, 2002

(65) Prior Publication Data

US 2003/0046570 A1    Mar. 6, 2003

(30) Foreign Application Priority Data

Aug. 7, 2001    (FI)    ................................. 20011611

(51) Int. Cl.
*H04L 9/32* (2006.01)
*G06F 11/30* (2006.01)
*G06F 12/14* (2006.01)

(52) U.S. Cl. ........................... 713/194; 713/193; 726/2
(58) Field of Classification Search ................. 713/193, 713/194; 726/2
See application file for complete search history.

(56) References Cited

U.S. PATENT DOCUMENTS

| | | | |
|---|---|---|---|
| 4,634,807 A | | 1/1987 | Chorley et al. ........... 178/22.08 |
| 4,694,490 A | * | 9/1987 | Harvey et al. ................ 380/234 |
| 4,704,725 A | * | 11/1987 | Harvey et al. ................ 380/242 |
| 5,109,414 A | * | 4/1992 | Harvey et al. ................ 725/135 |
| 5,134,700 A | | 7/1992 | Eyer et al. ................... 395/425 |
| 5,224,166 A | | 6/1993 | Hartman, Jr. |
| 5,233,654 A | * | 8/1993 | Harvey et al. ................ 725/135 |
| 5,237,616 A | * | 8/1993 | Abraham et al. ............ 713/193 |
| 5,333,306 A | * | 7/1994 | Abe ............................ 714/55 |
| 5,450,489 A | * | 9/1995 | Ostrover et al. ................ 705/51 |

(Continued)

FOREIGN PATENT DOCUMENTS

KR    2000-0024445    5/2000

(Continued)

OTHER PUBLICATIONS

Menezes et al., Handbook of Applied Cryptography, CRC PRess, 1996, chapters 1,8, and 10.*

(Continued)

*Primary Examiner*—Nasser Moazzami
*Assistant Examiner*—David García Cervetti
(74) *Attorney, Agent, or Firm*—Harrington & Smith, PC

(57) ABSTRACT

Processing information in an electronic device is carried out by at least one processing block for controlling the operation of the electronic device, and a memory. At least a first private key is used for processing information. At least a protected mode and a normal mode are established in the processing block. Part of the memory can be accessed only in said protected mode. At least said first private key is stored in the memory that is accessible in said protected mode.

85 Claims, 5 Drawing Sheets

U.S. PATENT DOCUMENTS

| | | | | |
|---|---|---|---|---|
| 5,481,610 A | * | 1/1996 | Doiron et al. | 380/270 |
| 5,497,241 A | * | 3/1996 | Ostrover et al. | 368/97 |
| 5,504,818 A | * | 4/1996 | Okano | 713/166 |
| 5,542,044 A | * | 7/1996 | Pope | 726/9 |
| 5,574,567 A | * | 11/1996 | Cookson et al. | 386/46 |
| 5,576,843 A | * | 11/1996 | Cookson et al. | 386/97 |
| 5,598,276 A | * | 1/1997 | Cookson et al. | 386/46 |
| 5,615,263 A | * | 3/1997 | Takahashi | 713/164 |
| 5,675,645 A | | 10/1997 | Schwartz et al. | |
| 5,796,828 A | * | 8/1998 | Tsukamoto et al. | 380/203 |
| 5,818,933 A | * | 10/1998 | Kambe et al. | 705/57 |
| 5,880,447 A | * | 3/1999 | Okada et al. | 235/380 |
| 5,887,243 A | * | 3/1999 | Harvey et al. | 725/136 |
| 5,905,372 A | * | 5/1999 | Kuffner et al. | 323/356 |
| 5,925,109 A | * | 7/1999 | Bartz | 710/14 |
| 5,953,502 A | * | 9/1999 | Helbig, Sr. | 726/24 |
| 5,966,442 A | * | 10/1999 | Sachdev | 380/212 |
| 5,970,228 A | * | 10/1999 | Nezu | 726/34 |
| 6,026,293 A | * | 2/2000 | Osborn | 455/411 |
| 6,088,262 A | * | 7/2000 | Nasu | 365/185.04 |
| 6,093,213 A | * | 7/2000 | Favor et al. | 703/27 |
| 6,169,890 B1 | | 1/2001 | Vatanen | 455/406 |
| 6,182,217 B1 | * | 1/2001 | Sedlak | 713/172 |
| 6,185,305 B1 | * | 2/2001 | Reinold et al. | 380/42 |
| 6,185,678 B1 | * | 2/2001 | Arbaugh et al. | 713/2 |
| 6,226,618 B1 | * | 5/2001 | Downs et al. | 705/1 |
| 6,289,455 B1 | * | 9/2001 | Kocher et al. | 713/194 |
| 6,311,273 B1 | * | 10/2001 | Helbig et al. | 726/2 |
| 6,324,628 B1 | * | 11/2001 | Chan | 711/163 |
| 6,338,044 B1 | * | 1/2002 | Cook et al. | 705/14 |
| 6,378,072 B1 | * | 4/2002 | Collins et al. | 713/187 |
| 6,389,403 B1 | * | 5/2002 | Dorak, Jr. | 705/52 |
| 6,398,245 B1 | * | 6/2002 | Gruse et al. | 280/228 |
| 6,411,772 B1 | * | 6/2002 | Cookson et al. | 386/94 |
| 6,441,641 B1 | * | 8/2002 | Pang et al. | 326/41 |
| 6,442,335 B1 | * | 8/2002 | Cookson et al. | 386/97 |
| RE38,007 E | * | 2/2003 | Tsukamoto et al. | 380/203 |
| 6,523,119 B2 | * | 2/2003 | Pavlin et al. | 713/192 |
| 6,529,602 B1 | * | 3/2003 | Walker et al. | 380/283 |
| 6,557,104 B2 | * | 4/2003 | Vu et al. | 713/189 |
| 6,574,609 B1 | * | 6/2003 | Downs et al. | 705/50 |
| 6,609,199 B1 | * | 8/2003 | DeTreville | 713/172 |
| 6,611,812 B2 | * | 8/2003 | Hurtado et al. | 705/26 |
| 6,615,192 B1 | * | 9/2003 | Tagawa et al. | 705/57 |
| 6,615,349 B1 | * | 9/2003 | Hair | 713/165 |
| 6,640,305 B2 | * | 10/2003 | Kocher et al. | 713/194 |
| 6,654,883 B1 | * | 11/2003 | Tatebayashi | 713/168 |
| 6,662,020 B1 | * | 12/2003 | Aaro et al. | 455/552.1 |
| 6,681,213 B2 | * | 1/2004 | Fujimori | 705/57 |
| 6,697,944 B1 | * | 2/2004 | Jones et al. | 713/168 |
| 6,704,871 B1 | * | 3/2004 | Kaplan et al. | 713/192 |
| 6,704,872 B1 | * | 3/2004 | Okada | 713/194 |
| 6,740,803 B2 | * | 5/2004 | Brinkman et al. | 84/609 |
| 6,772,340 B1 | * | 8/2004 | Peinado et al. | 713/168 |
| 6,775,655 B1 | * | 8/2004 | Peinado et al. | 705/59 |
| 6,775,779 B1 | * | 8/2004 | England et al. | 726/26 |
| 6,791,904 B1 | * | 9/2004 | Herron et al. | 368/13 |
| 6,816,596 B1 | * | 11/2004 | Peinado et al. | 380/277 |
| 6,820,177 B2 | * | 11/2004 | Poisner | 711/152 |
| 6,829,708 B1 | * | 12/2004 | Peinado et al. | 713/156 |
| 6,834,110 B1 | * | 12/2004 | Marconcini et al. | 380/239 |
| 6,837,430 B2 | * | 1/2005 | Yamada | 235/435 |
| 6,842,604 B1 | * | 1/2005 | Cook et al. | 455/3.06 |
| 6,842,803 B2 | * | 1/2005 | Schmidt et al. | 710/69 |
| 6,886,098 B1 | * | 4/2005 | Benaloh | 713/193 |
| 6,891,951 B2 | * | 5/2005 | Inoha et al. | 380/44 |
| 6,904,406 B2 | * | 6/2005 | Yamaji | 704/501 |
| 6,907,600 B2 | * | 6/2005 | Neiger et al. | 717/139 |
| 6,917,923 B1 | * | 7/2005 | Dimenstein | 705/51 |
| 6,934,817 B2 | * | 8/2005 | Ellison et al. | 711/153 |
| 6,937,814 B1 | * | 8/2005 | Chasen | 386/46 |
| 6,938,269 B2 | * | 8/2005 | Kajimoto | 725/93 |
| 6,941,458 B1 | * | 9/2005 | Ellison et al. | 713/164 |
| 6,948,073 B2 | * | 9/2005 | England et al. | 380/201 |
| 6,981,153 B1 | * | 12/2005 | Pang et al. | 713/194 |
| 6,986,052 B1 | * | 1/2006 | Mittal | 713/190 |
| 6,996,547 B1 | * | 2/2006 | Tugenberg et al. | 705/77 |
| 7,055,029 B2 | * | 5/2006 | Collins et al. | 713/161 |
| 7,103,782 B1 | * | 9/2006 | Tugenberg et al. | 713/194 |
| 7,117,370 B2 | * | 10/2006 | Khan et al. | 713/186 |
| 7,124,101 B1 | * | 10/2006 | Mikurak | 705/35 |
| 7,219,237 B1 | * | 5/2007 | Trimberger | 713/193 |
| 7,363,511 B2 | * | 4/2008 | Kiiveri | 713/193 |
| 2001/0003195 A1 | * | 6/2001 | Kajimoto | 709/310 |
| 2001/0007131 A1 | * | 7/2001 | Galasso et al. | 713/187 |
| 2001/0008015 A1 | * | 7/2001 | Vu et al. | 713/189 |
| 2001/0043798 A1 | * | 11/2001 | Ko et al. | 386/95 |
| 2002/0006204 A1 | * | 1/2002 | England et al. | 380/269 |
| 2002/0012432 A1 | * | 1/2002 | England et al. | 380/231 |
| 2002/0056081 A1 | * | 5/2002 | Morley et al. | 725/1 |
| 2002/0061185 A1 | * | 5/2002 | Hirabayashi et al. | 386/94 |
| 2002/0069359 A1 | * | 6/2002 | Watanabe | 713/176 |
| 2002/0080967 A1 | * | 6/2002 | Abdo et al. | 380/270 |
| 2002/0099948 A1 | * | 7/2002 | Kocher et al. | 713/194 |
| 2002/0147916 A1 | * | 10/2002 | Strongin et al. | 713/193 |
| 2002/0163522 A1 | * | 11/2002 | Porter et al. | 345/533 |
| 2002/0169974 A1 | * | 11/2002 | McKune | 713/200 |
| 2003/0031148 A1 | * | 2/2003 | Schmidt et al. | 370/337 |
| 2004/0117645 A1 | * | 6/2004 | Okuda et al. | 713/193 |
| 2005/0031123 A1 | * | 2/2005 | Ichinose et al. | 380/37 |
| 2005/0141011 A1 | * | 6/2005 | Han et al. | 358/1.14 |
| 2005/0144466 A1 | * | 6/2005 | Versteijlen et al. | 713/189 |

FOREIGN PATENT DOCUMENTS

WO　　　WO 00/17731　　　3/2000

OTHER PUBLICATIONS

B. Surnar et al, "GSM Security and Encryption", ECE 573 Final Presentation, Mar. 10, 1997, pp. 3-4.

B. Schneier, "Applied Cryptography", 2nd Ed., John Wiley & Sons, Inc., 1996, pp. 561-562.

* cited by examiner

METHOD FOR PROCESSING INFORMATION IN AN ELECTRONIC DEVICE, A SYSTEM, AN ELECTRONIC DEVICE AND A PROCESSING BLOCK

FIELD OF THE INVENTION

The present invention relates to a method for processing encrypted information in an electronic device which comprises at least one processing block for controlling the operation of an electronic device and memory, and in which method at least a first private key is used for processing the information. The invention also relates to a system for processing information in an electronic device which comprises at least one processing block for controlling the operation of an electronic device and memory, and which system contains means for using at least a first private key for processing information. The invention further relates to an electronic device that comprises means for processing information, at least one processing block for controlling the operation of an electronic device and a memory, and means for using at least a first private key for processing information. The invention further relates to a processing block that comprises at least one processor, memory, and means for using at least a first private key for processing information.

BACKGROUND OF THE INVENTION

With an increase in the data processing properties of portable devices, more information can be stored in them, which may also be confidential or otherwise such information that must not be revealed to an outsider. The carrying of portable devices will, however, increase the risk that the portable device is lost or stolen, wherein an attempt must be made to protect the information stored in it with an encryption method. For portable devices, it is typically possible to determine a password which the user must enter in the device when the device is turned on before the device can be used normally. However, such a protection is relatively easy to pass, because the passwords that are used are normally relatively short, typically having a length of less than ten characters. On the other hand, even if no attempt were made to find out the password, the information contained in the device can be accessed for example by transferring the storage medium, such as a hard disk, into another device. If the information contained in the storage medium is not in encrypted format, the information stored in the storage medium can be easily found out.

It is known that information needed by the user or the device can be encrypted with one key, the encrypted information can be stored in the memory of the device, and it can be decrypted with another key. In asymmetric encryption, the key used in encryption is different from the key used in decryption. Correspondingly, in symmetric encryption, the key used in encryption is the same as the key used in decryption. In asymmetric encryption, these keys are normally called a public key and a private key. The public key is intended for encryption and the private key is intended for decryption. Although the public key may be commonly known, on the basis of the same it is normally not possible to easily determine the encryption key corresponding to the public key, wherein it is very difficult for an outsider to find out information encrypted with this public key. One example of a system based on the use of such a public key and a private key is the PGP system (Pretty Good Privacy), in which the user encrypts the information to be transmitted with the public key of the receiver, and the receiver will then open the encrypted information with his/her private key. However, there are considerable drawbacks in the systems of prior art. The key strings required by sufficiently secure systems are so long that even their storage in a safe way causes considerable costs. If the key string is too short, it will be relatively easy to break it up with modern data processing equipment. In other words, the private key can be defined on the basis of the content and the public key (known content attack). This problem is particularly significant in portable data processing and communicating devices, in which the limited processing capacity also prevents the use of long keys.

The U.S. Pat. No. 6,169,890 discloses a method and device in which, after the user has been identified, it is possible to use a key stored in a SIM (Subscriber Identity Module) card for user identification in a communication network. The system is intended to be used for example in payment transactions, wherein the user performs payment transactions in his/her terminal which is arranged to communicate with a terminal of the payment system by means of the mobile communication network. Thus, the user enters his/her PIN (Personal Identity Number) code in the mobile station, and the user of the mobile station is identified on the basis of the code. The system comprises a database in which the mobile phone numbers of the users authorized to use the system have been stored. Thus, when the user contacts such a system, it is checked from the database on the basis of the number of the caller, whether the user is authorized to use the service. One drawback of such a system is that the PIN code used in the identification of the user is relatively short, typically four characters long, wherein it is relatively easy to find it out by means of methods known at present. When the length of the key is increased, the amount of memory required in the SIM card for storing the PIN code should be increased as well, which considerably raises the manufacturing costs of the SIM card. On the other hand, the act of storing the private key to such a memory which can be examined from outside the device, may present a significant safety risk, because when the device is lost or when it otherwise ends up in the hands of outsiders, the encrypted information may be found out on the basis of the encryption key stored in the device.

SUMMARY OF THE INVENTION

One purpose of the present invention is to bring about a method for processing encrypted information in such a manner that the decryption of information by analysing the device is not possible in practice. The invention is based on the idea that the processing block of the electronic device is set to operate at least in two different operating modes: a protected mode and a normal mode. The protected mode is arranged to be such that the information processed in the protected mode cannot be examined from outside the processing block. Thus it is possible to store an encryption key in the memory that can be used in the protected mode, said encryption key being used for encryption and decryption of information processed outside the protected mode in such a manner that this encryption key cannot be found out. More precisely, the method according to the present invention is primarily characterized in that at least a protected mode and a normal mode are established in the processing block, that part of the memory is accessible only in said protected mode, and that information of at least said first private key is stored in the memory that is accessible in said protected mode. The system according to the present invention is primarily characterized in that at least a protected mode and a normal mode are established in the processing block, that the processing block comprises means for accessing part of the memory only in said protected mode, and that information of at least said first private key is stored in the memory that is accessible in said protected mode. The electronic device according to the present invention is primarily characterized in that at least a protected mode and a normal mode are established in the processing block, that the processing block comprises means for accessing part of the memory only in said protected mode, and that information of at least said first private key is stored in the memory that is accessible in said protected mode. Further, the processing block according to the present invention is primarily characterized in that at least a protected mode and normal mode are established in the processing block, that the processing block comprises means for accessing part of the memory only in said protected mode, and that information at least on said first private key is stored in the memory that is accessible in said protected mode.

The present invention shows remarkable advantages compared to solutions of prior art. The analysis of the electronic device according to the invention in a manner enabling the examination of the protected mode is, in practice, impossible without breaking the electronic device. Because the encryption key used in the protected mode is advantageously device-specific, there is no use of finding out the encryption key of a broken device. When the method according to the invention is applied, it is possible to use longer keys, because in the protected mode it is possible to encrypt and/or decrypt a long encryption key. The encrypted encryption key can be stored in an external memory which is more advantageous than a memory used in the protected mode.

BRIEF DESCRIPTION OF THE DRAWINGS

In the following, the invention will be described in more detail with reference to the appended drawings, in which.

DETAILED DESCRIPTION OF THE INVENTION

Figure 1:
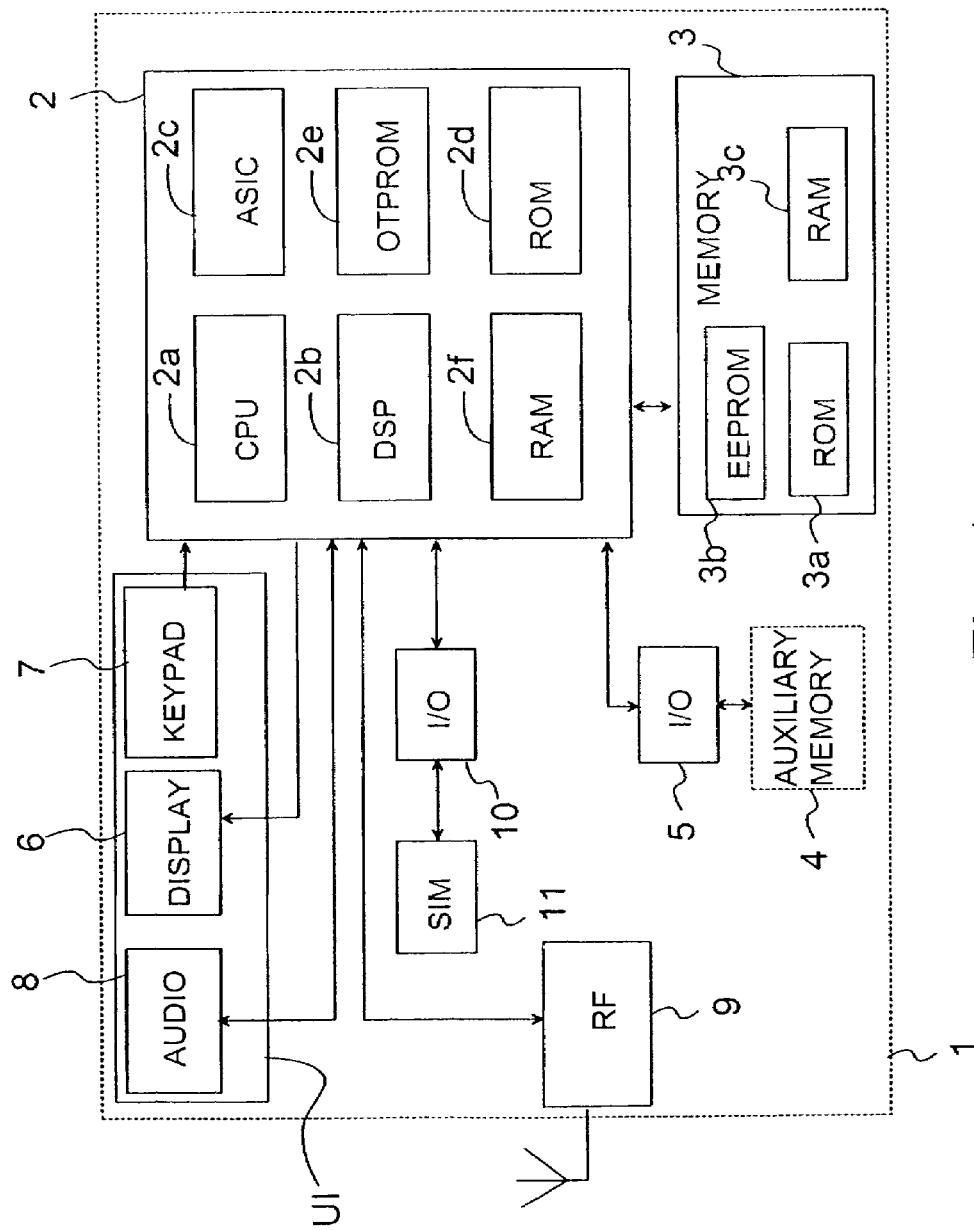
FIG. 1 shows an electronic device according to a preferred embodiment of the invention in a simplified block diagram.

The invention can be applied in an electronic device 1, in which it is possible to process information in at least partly encrypted format. Such electronic devices 1 include, for example, a mobile communication device, a computer, such as a personal computer (PC) or a portable computer, a personal digital assistant device (PDA), MP3 (MPEG-1 Audio Layer III) players, CD (Compact Disc) players, DVD (Digital Versatile Disk) players, video devices, digital TV (Television) sets, etc. The electronic device 1 according to an advantageous embodiment of the invention, shown in FIG. 1, comprises at least a control block 2, memory means 3, and a user interface (UI) which can advantageously comprise a display 6, a keyboard 7 and/or audio means 8. Furthermore, the electronic device according to FIG. 1 comprises mobile station radio frequency (RF) means 9 connected to an antenna, auxiliary memory means 4, auxiliary memory input/output means 5, SIM 11, and SIM input/output means 10. The memory means 3 preferably comprise a read-only memory ROM 3a and a random access memory RAM 3c. At least a part of the read-only memory ROM is an electrically erasable programmable read-only memory EEPROM 3b, such as a FLASH memory. The read-only memory ROM is used, for example, for storing program commands of the processor, for specific fixed setting data, or the like. The electrically erasable programmable read-only memory EEPROM can be used for example for storing the encryption key in the encrypted format, as will be presented below in this description.

Figure 2:
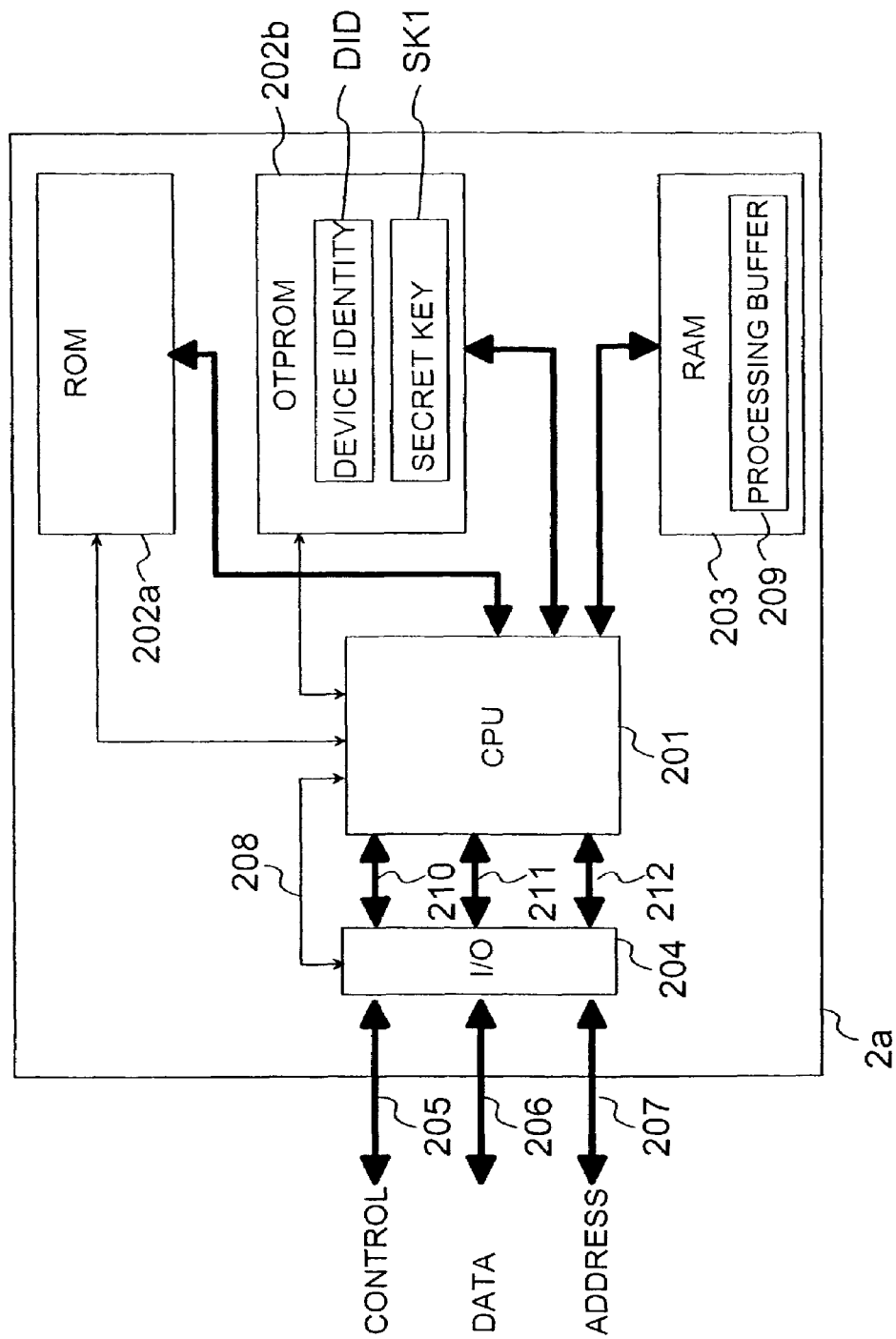
FIG. 2 shows the structure of the processing block according to a preferred embodiment of the invention in a simplified manner.

FIG. 2 shows, in a simplified manner, the structure of a processing block 2a of the control block 2 according to an advantageous embodiment of the invention. The processing block comprises a processor 201 (CPU, Central Processing Unit), and the program code controlling the function of the same can be partly stored in a read-only memory 202a, 202b, which can be a one-time programmable read-only memory (OTPROM) and/or reprogrammable read-only memory (for example EEPROM). Part of the boot program is advantageously stored in such a memory the contents of which cannot be changed after the program has been stored (OTPROM, ROM). This is necessary for example in such applications in which booting is conducted at least in two stages in such a manner that the preceding stage conducts the verification of the authenticity of the program code of the next stage before the execution of the program code of the next stage begins. A first private key SK1 used in connection with the method according to the invention is also stored in the read-only memory 202a, 202b, preferably in the one time programmable read-only memory 202b. The processing block 2a also contains a random access memory 203 which can be arranged in a manner known as such as a linear memory space and/or it can contain a random access memory for implementing the possible register structure of the processor. The processor 201 is not limited to any particular processor but it may vary in different applications, wherein the details of the memories 202a, 202b, 203 can differ from each other in different applications. The processing block 2a contains a connection block 204, by means of which the processing block 2a can be connected to the other functional blocks of the electronic device 1. Via the connection block 204 for example a control bus 210, a data bus 211 and an address bus 212 of the processor are coupled to the respective external control bus 205, data bus 206 and address bus 207 of the processing block 2a. In this advantageous embodiment of the invention, the processing block 2a and the other functional blocks 2b to 2f of the control block are presented as discrete blocks. However, it will be evident to anyone of skill in the art that at least some of said other functional blocks 2b to 2f of the control block can be arranged as a single integrated block in connection with the processing block 2a in such a manner that they can be used in the protected mode.

Figure 3:
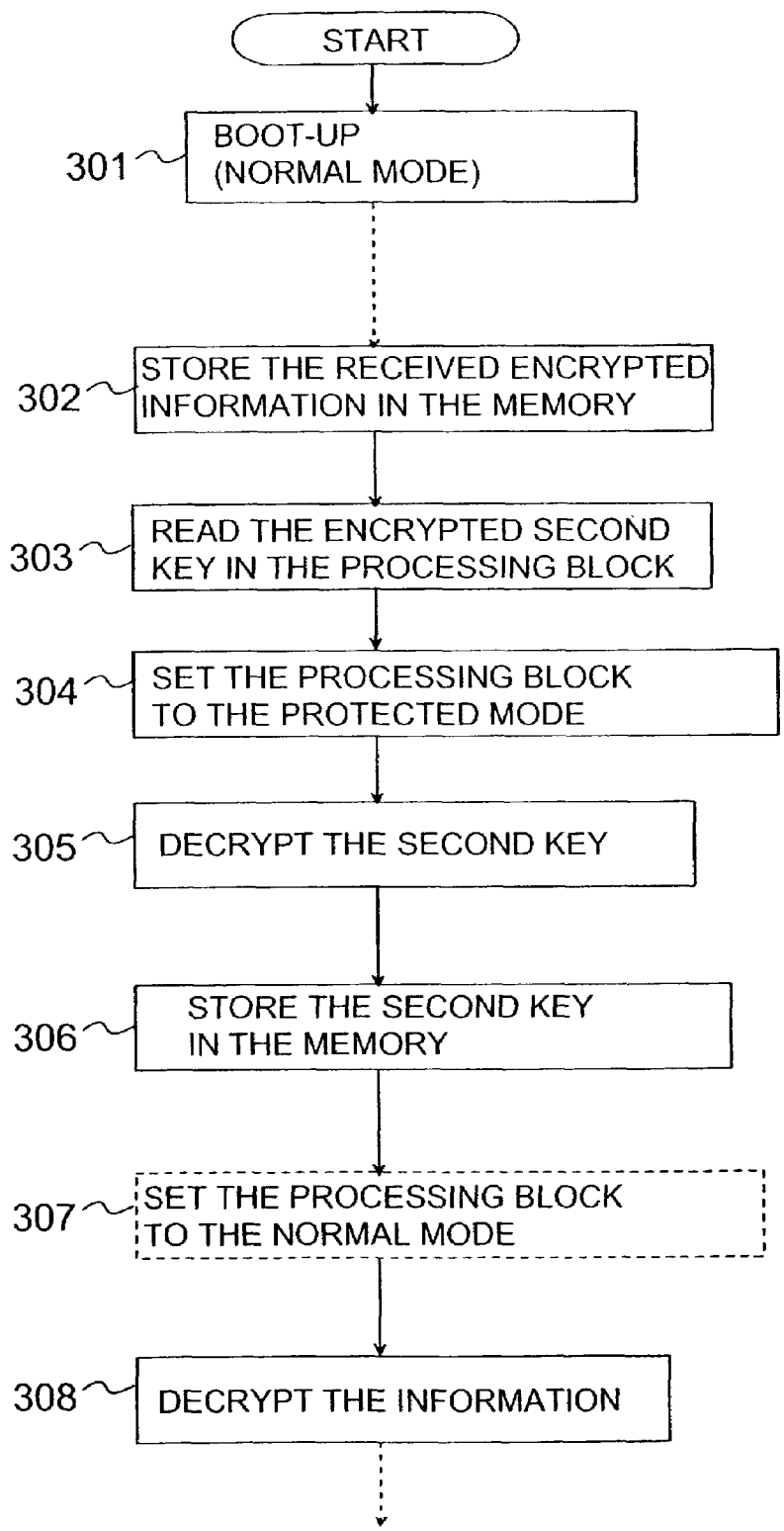
FIG. 3 shows the function of the method according to a preferred embodiment of the invention in a flow chart.

In the following, the operation of the method according to a preferred embodiment of the invention in the electronic device 1 of FIG. 1 will be described with reference to the flow chart of FIG. 3. In connection with the turning on of the electronic device, conventional boot-up operations known as such are executed (block 301 in FIG. 3). Here, in connection with the boot-up the processing block 2a is advantageously set to the normal mode. Thus, the control line 208 of the connection block 204 is set to a state in which the internal buses 210, 211, 212 of the processing block 2a are coupled to the external buses 205, 206, 207 of the processing block 2a. The control line 208 is advantageously also used for controlling the function of the internal random access memory 203 of the processing block 2a in such a manner that in the normal mode of the processing block the contents of the random access memory 203 cannot be read from outside the processing block 2a.

At that stage when it is necessary to process encrypted information, the following steps are taken in this preferred embodiment of the invention. It is, for example, assumed that encrypted information has been received via the mobile station RF means 9, which information is first stored in connection with the reception (block 302) in an external receiving buffer (not shown) of the processing block 2a. The receiving buffer is established, for example, in the random access memory 2f of the control block. The storing is conducted in a manner known as such, for example by means of a storage program formed in the program code of the processor, advantageously in such a manner that the processing block 2a reads the information received from the mobile station I/O means 5 and transfers it to the receiving buffer allocated in the memory 2f. The received information also contains information thereon that said information or at least part of it is in encrypted format. Thus, the information indicating the part of the information that is encrypted is also transmitted to the processing block 2a, wherein on the basis of this information the processor can conduct the necessary measures to use the second private key for decryption.

To decrypt the information, the second private key stored in the reprogrammable read-only memory 3b is advantageously decrypted in the following manner. The encrypted second private key SK2 is read in the internal random access memory 203 of the processing block 2a, for example to a processing buffer 209 (block 303). Thereafter, to shift to protected mode, the processor 201 of the processing block 201 sets the control line 208 of the connection block to a state in which there is no connection from the internal buses 210, 211, 212 of the processing block 2a to the external buses 205, 206, 207 (block 304). Thus, the internal function of the processing block 2a cannot be detected by means of conventional analysing means. In this protected mode the processor 201 can still read the internal random access memory 203 of the processing block 2a. Thereafter the processor 201 executes a program code by means of which the second private key SK2 is decrypted by means of the first private key SK1 (block 305) stored in the read-only memory 202a, 202b of the processing block. After the decryption, the second private key SK2 can be stored (block 306) in the random access memory, for example in the internal random access memory 203 of the processing block 2a, or in the random access memory 2f, 3c outside the processing block.

The decryption of the information to be processed can be conducted by using the second private key SK2. The processing block is possibly set to the normal mode by changing the state of the control line 208 of the connection block (block 307). Thus, it is possible to read the received encrypted information in the processing buffer 209 formed in the internal random access memory 203 of the processing block 2a. The amount of information that can be read in the processing block at a time can vary in different applications and different situations. In some cases it is possible to read all the encrypted information in the processing buffer 209, whereafter the read information is decrypted (block 308). In the decryption the second private key SK2 is now used, which second private key SK2 has been decrypted at an earlier stage.

The decryption of the information to be processed can be conducted either in the protected mode or in the normal mode. First, the function of the method is described in such a case where the decryption is conducted in the protected mode of the processing block 2a. Thus, the program code used in the decryption of information also has to be read advantageously in the random access memory 203 of the processing block 203, if it is not stored in the read-only memory 202a, 202b of the processing block 2a. If the program code used in the decryption is loaded from outside the processing block 2a, the authenticity of the program code must be verified before decryption. The processing block 2a is set to the normal mode and stored, encrypted information is read from the random access memory 2f, 3b in the internal read-only memory 203 of the processing block. Thereafter the processing block 2a is set to the protected mode, whereafter the processor 201 executes the program code used in the encryption of information from the internal memory 202a, 202b, 203. After the decryption the processing block 2a is set to the normal mode and the decrypted information is stored outside the processing block 2a in the random access memory 2f, 3c. Thereafter the next possible part of the encrypted information is subjected to corresponding processes for decryption and storing the information in the read-only memory 2f, 3c. The above-described process continues until the processed information has been decrypted.

If the second private key SK2 is in connection with the protected mode of the processing block 2a stored in such a memory which can be read in the normal mode of the processing block 2a, it may be possible that the second private key SK2 can be found out by analysing the device. This can be prevented in such a manner that before the processing block 2a is set from the protected mode to the normal mode, the second private key SK2 in the encrypted format is removed from such a random access memory which can be accessed in the normal mode. In practice, this means that the second private key SK2 is always decrypted when the processing block 2a has been set from the normal mode to the protected mode, and it is necessary to use this second private key SK2 for example for decryption of the encrypted information. In a corresponding manner, if the first private key SK1 has been copied from the read-only memory 202a, 202b to such a memory which can be read in the normal mode of the processing block 2a, the first private key SK1 is also removed from such a memory before the processing block 2a is set from the protected mode to the normal mode.

The internal read-only memory 202a, 202b of the processing block is relatively expensive when compared to the external read-only memory 2d, 2e, 3a, 3b, and thus the aim is to minimize the size of the internal read-only memory 202a, 202b. Thus, the code used in the decryption of the second private key SK2 is advantageously stored either in the read-only memory 2d, 2e of the control block or in the external read-only memory 3a, 3b, from which the program code is transferred to the internal random access memory 203 of the processing block 2a. The program code used in the decryption of the encrypted information is also advantageously stored in the read-only memory 202a, 202b of the processing block, or it is loaded from another read-only memory 2d, 2e, 3a, 3b of the electronic device 1 in the random access memory 203 before decryption. If the program code is loaded from outside the processing block, the program code verifying the authenticity of the program code is stored in the read-only memory 201 of the processing block. In a preferred embodiment of the invention the internal read-only memory 202a, 202b of the processing block 2a contains primarily the first private key SK1 stored therein.

In the method according to a second preferred embodiment of the invention, the decryption is primarily conducted outside the processing block 2 in the following manner. The processing block 2 decrypts the second private key SK2 in the protected mode in accordance with the above-presented principles, and stores this second private key in the external random access memory 2f, 3c of the processing block 2a in an unencrypted format. Thereafter, the information is decrypted in the normal mode of the processing block 2a. After this, the processing block 2a can be in the normal mode, because the access to the read-only memory 202a, 202b used for storing the first private key SK1 has been denied. In this alternative the encrypted information does not have to be read in the internal random access memory 203 of the processing block 2a, but the operation can be implemented primarily in the external memory means 2f, 3c of the processing block 2a. The second private key SK2 stored in the random access memory 2f, 3c disappears from the random access memory 2f, 3c latest when the operating voltage of the electronic device 1 is switched off. Thus, there is no risk that an outsider could easily find out the second private key SK2 stored in the electronic device 1.

This second embodiment is advantageous especially in such applications in which the act of keeping the private keys secret does not require as high a level of protection as in the first preferred embodiment. Because in this method according to the second embodiment the second private key is not always decrypted when the processing block is set to the protected mode, less processing capacity is required from the processing block 2a. Thus, the method according to the second preferred embodiment can be used in such embodiments in which continuous decryption is necessary, for example in connection with the processing of an encrypted video signal, and in which the level of protection according to the second embodiment is sufficient.

Because the first private key SK1 stored in the internal read-only memory of the processing block 2a is primarily used for decryption of the second private key SK2, the first private key SK1 can be relatively short. The invention, however, enables the act of increasing the length of the second private key SK2 without having to increase the amount of the internal read-only memory 202a, 202b of the processing block, that is considerably more expensive than the external memory. The first private key SK1 used in connection with the invention is advantageously a symmetric key, but it should be evident that the invention is not restricted solely to applications of this type. Typically, the minimum length of symmetric keys is approximately 100 bits and by comparison therewith, the minimum length of asymmetric keys is approximately ten times as long, i.e. ca 1000 bits.

The description hereinabove presents only one possible way of implementing the protected mode. It is, however, evident that in practice the protected mode can also be implemented with another method in such a manner that the analysis of the internal function of the processing block 2a in the protected mode is extremely difficult or even impossible. Especially the examination of the internal read-only memory 202a, 202b of the processing block 2a from outside has to be made as difficult as possible. Furthermore when the solution according to the invention is used, it is, in practice, impossible to find out the first private key SK1 without breaking the device. On the other hand, the internal read-only memory 202a, 202b of the processing block can be divided into a protected area and an unprotected area, wherein it is possible to allow access to the unprotected area from outside the processing block 2a and/or the processor 201 can read the contents of this unprotected area also in the normal mode. In this case such information is stored in the protected area which can only be accessed by the processor 201 in the protected mode. In addition, it is evident that the internal random access memory of the processing block 2a can also be divided into a protected and unprotected area, wherein there is no access to the protected area from outside the processing block 2a.

The invention can also be applied by using two or more processors (not shown) instead of one processor 201. Thus, at least one processor 201 is primarily used in the protected mode, and the other processors are used in the normal mode. The other processors do not have an access to read the memory 202a, 202b, 203 used by the processor operating in the protected mode. The necessary communication between the processor 201 of the protected mode and the other processors can in this embodiment be arranged for example by means of a dual port memory (not shown) or by determining in the random access memory 2f, 3c a memory space which can be processed by the processor of the protected mode and by at least one normal mode processor.

Hereinabove, an embodiment of the invention was described in which information was decrypted. In a corresponding manner, the invention can be applied for encryption of information to be transmitted and/or stored to a storage medium by means of the second private key SK2. In that case as well, the second private key SK2 is decrypted, if it has not been decrypted already. Thereafter the information can be encrypted with this second private key SK2 with measures substantially reverse to the decryption. Also in this situation the decryption can be performed either inside the processing block 2a by transferring the information to be encrypted entirely or partly to the internal random access memory 203 of the processing block 2a to be encrypted therein, or the encryption is conducted outside the processing block 2a. After the encryption the encrypted information is, for example, transmitted to the mobile communication network NW, or it is stored in a storage medium, such as the random access memory 2f, 3c or reprogrammable read-only memory 3b.

Figure 4:
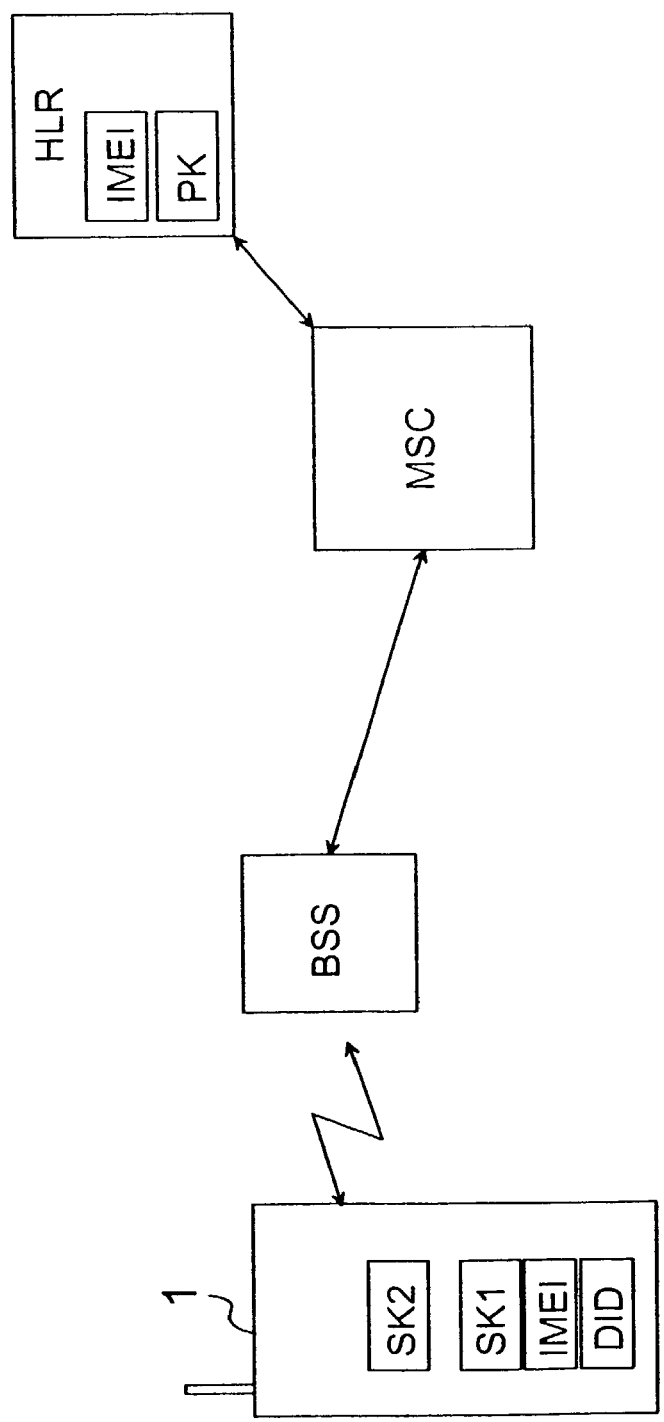
FIG. 4 illustrates the identification of the user in a mobile communication system in a simplified block diagram.

The invention is suitable to be used also in reliable identification of the user's electronic device 1, for example in a mobile communication system according to FIG. 4. Thus, the first private key SK1 stored in the internal read-only memory 202a, 202b of the processing block 2a is used for verifying the electronic device for example with a digital signature advantageously in the following manner. Advantageously, the second private key SK2 is stored in an encrypted format in the external read-only memory 3a, 3b of the processing block 2a. Thus, this second private key SK2 is decrypted by means of the first private key SK1 stored in the internal read-only memory 202a, 202b of the processing block 2a, as was presented earlier in this description. Thereafter the second private key SK2 can be used for example for forming a digital signature. The mobile station means of the electronic device 1 are utilized to communicate with a mobile services switching centre MSC in a way known as such via a base station system BSS. At the connection set-up stage identification information is established in the electronic device, for example from the device identity DID, and possibly from the international mobile equipment identity (IMEI). The identification information can be verified with a digital signature. The device identity DID is advantageously stored in the internal one time programmable read-only memory 202b of the processing block 2a. Thus, the processing block 2a is set to a protected mode and the device identity DID is read in the random access memory 203. Thereafter a hash value is calculated from the device identity DID and possible other identification information for example by means of a hash function. The hash value is signed in a manner known as such by using the second private key SK2. Thereafter the processing block 2a is set to the normal mode and the identification information and the digital signature are transferred to the external random access memory 2f, 3c of the processing block. Now the identification data and the digital signature can be transmitted to the mobile communication network for the identification of the user's electronic device 1. The mobile communication network, for example a home location register HLR, contains information on the international mobile equipment identity IMEI and the public key PK corresponding to the second private key SK2 used in signing the identification information of the electronic device 1, by means of which public key it is possible to verify the authenticity of the digital signature. Thus, it is possible to rely on the identification data formed by means of the method according to the invention.

It is obvious that, for different uses, it is possible to store more than one private key SK1 in the read-only memory 202a, 202b of the processing block 2a. On the other hand, one private key SK1 stored in the read-only memory 202a, 202b of the processing block 2a can be used for encrypting several keys SK2 needed in the operation of the electronic device. Furthermore, the first private key SK1 can also be used for decryption of the device identity DID, if the device identity DID is not stored in the protected internal read-only memory 202a, 202b of the processing block 2a. Such keys and/or device identity can thus be stored in encrypted format in the external memory means 2d, 2e, 3 of the processing block 2a, wherein when such keys and/or device identity is used, decryption is performed according to the invention by means of the first private key SK1, as was already disclosed earlier in this description.

In encryption and decryption it is possible to use the same keys (symmetric encryption), or the keys can be different (asymmetric decryption), wherein the term public key and private key are generally used for the keys. The public key is intended for encryption and the corresponding private key is intended for decryption. There are a number of known encryption methods which can be applied in connection with the present invention. Symmetric encryption methods to be mentioned in this context include Data Encryption Standard (DES), Advanced Encryption Standard (AES), and Rivest's Cipher 2 (RC2). An asymmetric encryption method is Rivest, Shamir, Adleman (RSA). Also so-called hybrid systems have been developed, employing both asymmetric encryption and symmetric encryption. In such systems, asymmetric encryption is normally used when the encryption key to be used in symmetric encryption is transmitted to the receiver, wherein the symmetric encryption key is used in the encryption of actual information.

For the transmission of public keys to be used in asymmetric encryption, a system has been developed which is called Public Key Infrastructure (PKI). This system comprises servers in which the public keys are stored and from which a user needing a key can retrieve the key. Such a system is particularly applicable for use by companies, wherein the company itself does not need to transmit its public key to anyone who wishes to transmit information to the company in an encrypted format.

Figure 5:
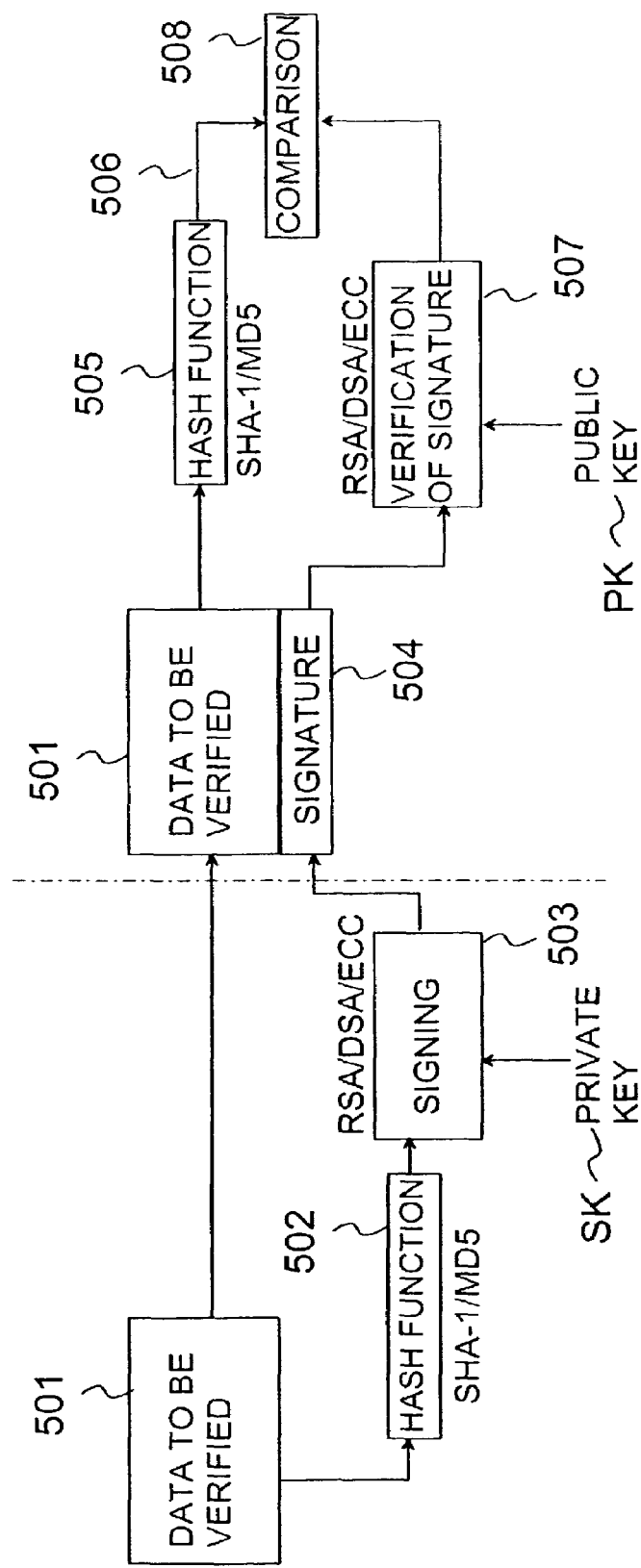
FIG. 5 shows a known principle on forming a digital signature.

For digital signatures, several systems have been developed, such as the RSA, DSA (Digital Signatures Algorithm), and ECC (Elliptic Curve Cryptography). These systems use algorithms which compress the information to be signed, including SHA-1 (Secure Hash Algorithm) and MD5 (Message Digest 5) to be mentioned in this context. FIG. 5 shows the forming of a digital signature in a principle view. After this, data 501 to be signed is transmitted to a block 502 executing a hash function. After this, the hash data formed by the hash function is signed 503 with a private key SK. The signature 504 is connected to the data 501 to be signed. At the stage of verifying the signed data, the data confirmed with the signature is led to a block 505 performing the hash function, for producing hash data 506. The signature is verified 507 by using a public key PK corresponding to the signatory's private key, after which the hash data 506 is compared 508 with the data formed in the verification 507 of the signature. If the data match, the signed data can be relied on with a high probability.

At the stage of manufacture of the electronic device 1 according to the invention, and/or at the stage of updating the software, the required confirmation data and programs are formed in the memory 2d, 2e, 3a, 3b preferably in the following way. The program codes required in the verifications are stored in the control block 2, including a boot program, a program for computing the digital signature, and encryption and decryption algorithm/algorithms. The manufacturer stores the first private key SK1 and possibly also the device identity DID in the read-only memory 202a, 202b of the processing block. At the stage of assembling the components (block 302), also the control block 2 is installed in the circuit card of the electronic device 1 (not shown). The manufacturer stores the other possible application programs for example in the programmable memory 3b and/or in the one time programmable memory 3a. After this, the electronic device 1 can be delivered to a dealer or a service provider, such as a mobile telephone operator.

Although it has been disclosed above that the first private key SK1 is stored in the read-only memory 202a, 202b of the protected mode, it will be evident that instead of the same it is possible to store other information in the read-only memory, on the basis of which the first private key SK1 can be established again. One such alternative is the storing of a seed number, wherein a program is established in the program code of the processor 201 to generate a first private key SK1 on the basis of this seed number.

It should also be evident that the present invention is not limited solely to the above-presented embodiments, but it can be modified within the scope of the appended claims.

The invention claimed is:

1. A method, comprising:
   operating a processing block in an electronic device in one of at least a protected mode, where at least certain information used in the protected mode has limited accessibility, and a normal mode where at least certain information used in the protected mode cannot be used or accessed in the normal mode, at least part of a memory being accessible by a processor of the processing block only in said protected mode, and
   decrypting at least one second private key using information of at least a first private key stored in the at least part of the memory that is accessible by said processor only in said protected mode;
   where when the processing block is operated in the protected mode further comprising preventing access to the processing block from outside the processing block.

2. The method according to claim 1, wherein in said protected mode transfer of information from the processing block is prevented to prevent determination of an internal function of the processing block.

3. The method according to claim 1, where the processor executes a program code that when executed results in the decryption of said at least one second private key through use of said first private key.

4. The method according to claim 1, wherein the electronic device receives encrypted information, wherein to decrypt the encrypted information, said at least one second private key is decrypted using said first private key, and the encrypted information is decrypted using said decrypted second private key.

5. The method according to claim 1, wherein said processing block comprises a single processor configurable to be used as part of initiating and as part of controlling operation in the protected mode, and as part of initiating and as part of controlling operation in the normal mode, and when said first private key is used, the processing block is set in said protected mode.

6. The method according to claim 1, said electronic device comprising at least a device identity stored therein, where said at least one second private key entails at least one public key; wherein authentication comprises:
  decryption of said second private key,
  forming a digital signature based on said device identity to verify authenticity of the device identity, in which said second private key is used, and
  verifying said digital signature with said public key to identify the electronic device.

7. The method according to claim 1, where the at least part of the memory that is accessible by said processor only in said protected mode comprises one-time programmable read-only memory.

8. The method according to claim 1, where the at least part of the memory that is accessible by said processor only in said protected mode comprises reprogrammable read-only memory.

9. The method according to claim 1, where the at least part of the memory that is accessible by said processor only in said protected mode comprises electrically erasable programmable read-only memory.

10. The method according to claim 1, where the at least part of the memory that is accessible by said processor only in said protected mode is arranged with the processing block in an integrated processor block.

11. The method according to claim 1, where the at least part of the memory that is accessible by said processor only in said protected mode comprises random access memory.

12. The method according to claim 1, further comprising storing the decrypted second private key in said part of the memory that is accessible only in said protected mode.

13. The method according to claim 1, further comprising storing the decrypted second private key in part of the memory that is accessible in said normal mode.

14. The method of claim 1, where the processor executes a program code that results in the decryption of the at least one second private key through use of said first private key.

15. The method of claim 14, where before allowing access to the at least one first private key said processor takes an action that results in shifting to the protected mode.

16. The method of claim 1, where the processor controls the decryption of the at least one second private key.

17. The method of claim 1, where the processor takes part in the decryption process of the least one second private key.

18. The method of claim 1, where at least part of the memory that is accessible by the processor only in said protected mode comprises one-time programmable read-only memory or reprogrammable read-only memory.

19. The method of claim 1, where at least part of the memory that is accessible by the processor only in said protected mode comprises one-time programmable read-only memory or reprogrammable read-only memory that comprises part of said processing block.

20. The method of claim 1, where before allowing access to the at least one first private key said processor takes an action that results in shifting to the protected mode.

21. the method of claim 1, where the same processor takes part in implementation of at least all of the following processes: control of whether operation of the processing block is shifted to the normal mode or to the protected mode; accessing information of the at least one first private key; and decryption of the second private key through use of the first private key.

22. The method of claim 21, where the same processor takes part in restricting access to the information of the at least one first private key.

23. The method of claim 21, where before allowing access to the information of the at least one first private key the same processor takes an action that results in shifting to the protected mode.

24. The method of claim 21, where the information of at least one first private key that is accessible by the same processor only in said protected mode is taken from at least part of a one-time programmable read-only memory or from at least part of a reprogrammable read-only memory.

25. The method of claim 1, where preventing access comprises providing no connection between address, control and data buses internal to the processing block and address, control and data buses external to the processing block.

26. The method of claim 1, where said processing block comprises the processor, read only memory that stores the first private key, random access memory and a connection block that is configurable in the normal mode to provide a bi-directional connection between address, control and data buses internal to said processing block and address, control and data buses external to said processing block to enable signal information flow to and from said processing block.

27. The method of claim 26, where in the normal mode the random access memory cannot be read from outside the processing block.

28. The method of claim 26, where the read only memory also stores a device identity of an electronic device that comprises the processing block.

29. The method of claim 28, further comprising decrypting the device identity using the first private key.

30. The method of claim 1, where the processor is disposed in a signal path between address, control and data buses internal to the processing block and address, control and data buses external to the processing block.

31. An apparatus comprising:
  means for controlling operation of the apparatus, said means for controlling comprising a processing block comprising a single processor and a memory, and
  means for using at least a first private key for processing information, wherein one of at least a protected mode and a normal mode are established by the processing block, and
  means, responsive to said protected mode being established by the processing block, for preventing access to said processing block from outside said processing block;
  the processing block configured such that (1) at least part of the memory is accessible by said processor only in said protected mode, and (2) information of at least said first private key is stored in the part of the memory that is accessible by said processor only in said protected mode, the apparatus and processor configured such that (1) at least one second private key can be stored in an encrypted format in memory that is accessible by the processor in said normal mode and (2), said at least one second private key can be decrypted by said using means by use of said first private key.

32. The apparatus according to claim 31, wherein the at least a part of the memory that is accessible by said processor only in said protected mode is a one time programmable read-only memory.

33. The apparatus according to claim 31, where the at least part of the memory that is accessible by said processor only in said protected mode comprises reprogrammable read-only memory.

34. The apparatus according to claim 31, where the at least part of the memory that is accessible by said processor only in said protected mode comprises electrically erasable programmable read-only memory.

35. The apparatus according to claim 31, where the processing block has the at least part of the memory that is accessible only by said processor in said protected mode and the processor integrated therewith as an integrated processor block.

36. The apparatus of claim 31, where said using means decrypts the at least one second private key while the protected mode is established.

37. The apparatus of claim 31, where said using means decrypts the at least one second private key while the normal mode is established.

38. The apparatus of claim 31, where said at least part of the memory that is accessible by said processor only in said protected mode comprises one-time programmable read-only memory.

39. The apparatus of claim 31, where said at least part of the memory that is accessible by said processor only in said protected mode comprises reprogrammable read-only memory.

40. The apparatus of claim 31, where said at least part of the memory that is accessible by said processor only in said protected mode comprises electrically erasable programmable read-only memory.

41. The apparatus of claim 31, where at least said processor and said at least part of the memory that is accessible by said processor only in said protected mode are arranged in an integrated processor block.

42. A method, comprising:
   in a normal mode of operation of a processing block, receiving encrypted information;
   storing the encrypted information in a memory;
   reading an encrypted key from a portion of the memory that is accessible when in the normal mode of operation;
   setting a protected mode of operation of the processing block;
   forming a decrypted key by decrypting the encrypted key using another key that is obtained by a processor of the processing block by reading from a portion of the memory of the processing block that is accessible by the processor only in the protected mode of operation; and
   decrypting the encrypted information using the decrypted key;
   where when said processing block is operated in said protected mode further comprising preventing access to said processing block from outside said processing block.

43. The method of claim 42, where decrypting the encrypted information using the decrypted key is performed while in the protected mode of operation of the processing block.

44. The method of claim 42, where decrypting the encrypted key further comprises setting the normal mode of operation of the processing block, and where decrypting the encrypted information using the decrypted key is performed while in the normal mode of operation.

45. The method of claim 42, where at least the another key is comprised of a symmetric key.

46. The method of claim 42, where at least the another key is comprised of an asymmetric key.

47. The method of claim 42, where the another key is generated by a program that operates on data stored in the memory that is accessible by the processor only in the protected mode of operation.

48. The method of claim 42, executed in a mobile communication device.

49. The method of claim 42, executed in one of personal computer or a portable computer.

50. The method of claim 42, executed in one of a personal digital assistant, an MP3 player, a CD player, a DVD player, a video device or a digital television set.

51. The method of claim 42, executed in an integrated processor block.

52. A computer readable medium having a computer program comprising program code for controlling operation of a processor, the code when executed by the processor resulting in at least the following:
   in a normal mode of operation of the processor, receiving encrypted information, the processor comprising a part of a processing block;
   storing the encrypted information in a memory;
   reading an encrypted key from a portion of the memory that is accessible by the processor when in the normal mode of operation;
   setting a protected mode of operation of the processing block;
   forming a decrypted key by decrypting the encrypted key using another key that is obtained by reading memory that is accessible by the processor only in the protected mode of operation; and
   decrypting the encrypted information using the decrypted key;
   where when the processing block is operated in the protected mode of operation further comprising preventing access to the processing block from outside the processing block.

53. The computer readable medium of claim 52, where the operation of decrypting the encrypted information using the decrypted key is performed while in the protected mode of operation.

54. The computer readable medium of claim 52, where the operation of decrypting the encrypted key further comprises setting the normal mode of operation, and where the operation of decrypting the encrypted information using the decrypted key is performed while in the normal mode of operation.

55. The computer readable medium of claim 52, where the another key is generated by program code that operates on data stored in the memory that is accessible by the processor only in the protected mode of operation.

56. The computer readable medium of claim 52, embodied in a mobile communication device.

57. The computer readable medium of claim 52, embodied in one of personal computer or a portable computer.

58. The computer readable medium of claim 52, embodied in one of a personal digital assistant, an MP3 player, a CD player, a DVD player, a video device or a digital television set.

59. The computer readable medium of claim 52, where the processor is a central processing unit.

60. A method, comprising:
   reading an encrypted key from a memory that is accessible when in a normal mode of operation of a processing block that comprises a processor;
   setting a protected mode of operation of the processing block;
   forming a decrypted key by decrypting the encrypted key using another key that is accessed by the processor from a memory that is accessible by the processor only in the protected mode of operation; and encrypting information using the decrypted key;

where when the processing block is operated in the protected mode of operation further comprising preventing access to the processing block from outside the processing block.

61. The method of claim 60, further comprising transmitting the encrypted information to a mobile communication network.

62. The method of claim 60, further comprising storing the encrypted information in a storage medium.

63. An apparatus, comprising at least one processing block configured to control operation of an electronic device, the processing block comprising a processor and memory, the processing block configured to use at least one first private key and at least one second private key for processing information, where for the processing block one of a protected mode and a normal mode are selectively settable, at least a part of the memory being accessible by the processor only in said protected mode, where information of at least said first private key is stored in the at least a part of the memory that is accessible by the processor only in said protected mode and is readable by said processor only in said protected mode, said second private key being decryptable using said first private key, further comprising a connection block configured to respond to said protected mode being set to prevent access to said processing block from outside said processing block.

64. The apparatus according to claim 63, where said connection block comprises at least one circuit configured to prevent transfer of information from outside the processing block in said protected mode, where determination of an internal function of the processing block is prevented in said protected mode.

65. The apparatus according to claim 63, where said electronic device comprises an input unit to receive encrypted information, and further comprising a decryption function configured to decrypt the encrypted information using said decrypted second private key.

66. The apparatus according to claim 65, further comprising an interface for communication with an authentication device configured to authenticate the electronic device, said electronic device having at least one device identity (DID) stored therein, where said at least one second private key that is encrypted with said first private key entails at least one public key, where said decryption function is further configured to decrypt said at least one device identity for forming a digital signature on the basis of said device identity to verify the authenticity of the device identity by using said second private key, where said authentication device verifies said digital signature with said public key to authenticate the electronic device.

67. The apparatus according to claim 63, where said processing block is configured to be set in said protected mode when said first private key is used.

68. The apparatus according to claim 63, where said at least a part of the memory that is readable by said processor only in said protected mode comprises a one time programmable read-only memory.

69. The apparatus according to claim 63, where in the normal mode a random access memory of said processor block cannot be read from outside said processor block.

70. The apparatus according to claim 63, where said first private key is comprised of a symmetric key.

71. The apparatus according to claim 63, where said first private key is comprised of an asymmetric key.

72. The apparatus according to claim 63, where said at least a part of the memory that is readable by said processor only in said protected mode comprises read-only memory.

73. The apparatus according to claim 63, where said at least a part of the memory that is readable by said processor only in said protected mode comprises reprogrammable read-only memory.

74. The apparatus according to claim 63, where said at least a part of the memory that is readable by said processor only in said protected mode comprises electrically erasable programmable read-only memory.

75. The apparatus according to claim 63, where said at least a part of the memory that is readable by said processor only in said protected mode is arranged with said processor in an integrated processor block.

76. The apparatus of claim 63, where the same processor is configured to take part in implementation of at least all of the following processes: control of whether operation of the processing block is shifted to the normal mode or to the protected mode; accessing information of the at least one first private key; and decryption of the second private key through use of the first private key.

77. The apparatus of claim 76, where the same processor is also configured to take part in restricting access to the information of the at least one first private key.

78. The apparatus of claim 76, where the same processor is also configured, before allowing access to the information of the at least one first private key, to take an action that results in shifting to the protected mode.

79. The apparatus of claim 76, where the same processor is also configured to obtain the information of at least one first private key, that is accessible by the processor only in said protected mode, from at least part of a one-time programmable read-only memory or from at least part of a reprogrammable read-only memory.

80. The apparatus of claim 63, where said connection block is configured to prevent access by providing no connection between address, control and data buses internal to the processing block and address, control and data buses external to the processing block.

81. The apparatus of claim 63, where said processing block comprises the processor, read only memory that stores the first private key, random access memory and said connection block, where said connection block is configurable in the normal mode to provide a bi-directional connection between the address, control and data buses internal to said processing block and the address, control and data buses external to said processing block to enable access to and from said processing block.

82. The apparatus of claim 81, where in the normal mode the random access memory cannot be read from outside the processing block.

83. The apparatus of claim 81, where the read only memory also stores a device identity of the electronic device.

84. The apparatus of claim 83, said processor block configured to decrypt the device identity using the first private key.

85. The apparatus of claim 63, where said processor is disposed in a signal path between address, control and data buses internal to said processing block and address, control and data buses external to said processing block.

* * * * *